United States Patent
Odell et al.

(10) Patent No.: US 7,164,338 B2
(45) Date of Patent: Jan. 16, 2007

(54) METHOD AND APPARATUS FOR SUBSTANTIALLY REDUCING ELECTRICAL EARTH DISPLACEMENT CURRENT FLOW GENERATED BY WOUND COMPONENTS

(75) Inventors: Arthur B. Odell, Cupertino, CA (US); Chan Woong Park, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 11/249,848

(22) Filed: Oct. 13, 2005

(65) Prior Publication Data

US 2006/0034101 A1   Feb. 16, 2006

Related U.S. Application Data

(63) Continuation of application No. 11/072,938, filed on Mar. 3, 2005, now Pat. No. 6,992,903, which is a continuation of application No. 10/850,889, filed on May 20, 2004, now Pat. No. 6,894,909, which is a continuation of application No. 10/392,998, filed on Mar. 19, 2003, now Pat. No. 6,762,946, which is a continuation of application No. 10/052,975, filed on Jan. 17, 2002, now Pat. No. 6,549,431.

(60) Provisional application No. 60/316,565, filed on Aug. 31, 2001, provisional application No. 60/274,689, filed on Mar. 8, 2001.

(51) Int. Cl.
*H01F 27/28* (2006.01)
*H01F 27/24* (2006.01)

(52) U.S. Cl. .................. 336/181; 336/212; 336/182

(58) Field of Classification Search .............. 336/212, 336/180–184
See application file for complete search history.

(56) References Cited

U.S. PATENT DOCUMENTS 2,553,324 A   5/1951   Lord
3,299,384 A * 1/1967   Lee ........................ 336/171
3,963,975 A   6/1976   Gauper, Jr. et al.
4,089,049 A   5/1978   Suzuki et al.
4,507,721 A   3/1985   Yamano et al.
4,518,941 A   5/1985   Harada (Continued)

FOREIGN PATENT DOCUMENTS

JP   60226112   11/1985

(Continued)

OTHER PUBLICATIONS

Tsaliovich, A., "Electromagnetic Shielding Handbook for Wired and Wireless EMC Applications," Kluwer Academic Publishers, Norwell, Mass., U.S.A., (1999), pp. 325-331.

(Continued)

*Primary Examiner*—Anh Mai
(74) *Attorney, Agent, or Firm*—Blakely, Sokoloff, Taylor & Zafman, LLP

(57) ABSTRACT

An energy transfer element having an energy transfer element input winding and an energy transfer element output winding. In one aspect, the energy transfer element input winding is capacitively coupled to the energy transfer element output winding. The energy transfer element is capacitively coupled to electrical earth. One or more additional windings are introduced as part of the energy transfer element. The one or more additional windings substantially reduce capacitive displacement current between the energy transfer element input winding and energy transfer element output winding by balancing the relative electrostatic fields generated between these windings and/or between the energy transfer element and electrical earth by canceling the electrostatic fields generated by all windings within the energy transfer element relative to electrical earth through the selection of the physical position and number of turns in the additional windings.

5 Claims, 3 Drawing Sheets

U.S. PATENT DOCUMENTS

| | | | |
|---|---|---|---|
| 4,707,673 | A | 11/1987 | Lee et al. |
| 5,579,202 | A | 11/1996 | Tolfsen et al. |
| 5,615,091 | A | 3/1997 | Palatnik |
| 6,323,602 | B1 | 11/2001 | De Groot et al. |
| 6,549,431 | B1 | 4/2003 | Odell et al. |
| 6,714,426 | B1 | 3/2004 | Guo et al. |
| 6,762,946 | B1 | 7/2004 | Odell et al. |
| 6,894,909 | B1 | 5/2005 | Odell et al. |
| 6,903,642 | B1 | 6/2005 | Mayfield et al. |
| 2004/0257839 | A1 | 12/2004 | Yang et al. |

FOREIGN PATENT DOCUMENTS

| | | | |
|---|---|---|---|
| JP | 10052036 | * | 2/1998 |

OTHER PUBLICATIONS

Williams, T., "EMC for Product Designers," Butterwork-Heinemann Ltd, Linacre House, Jordan Hill, Oxford, OX2 8DP, 1992, pp. 121-169.

Gabrielson, B.C. et al., "Suppression of Powerline Noise with Isolation Transformers," Published and presented at EMC EXPO87, May 19-21, 1987, San Diego, CA, downloaded Apr. 14, 2005, www.blackmagic.com/ses/bruceg/EMC/isolatrans.html, (6 pages).

Horna, O.A., "HF Transformer With Triaxial Cable Shielding Against Capacitive Current," IEEE Transactions on Parts, Hybrids, and Packaging, vol. PHP-7, No. 3, Sep. 1971, pp. 109-114.

European Search Report, Application No. EP 02251629, Aug. 1, 2003.

* cited by examiner

METHOD AND APPARATUS FOR SUBSTANTIALLY REDUCING ELECTRICAL EARTH DISPLACEMENT CURRENT FLOW GENERATED BY WOUND COMPONENTS

REFERENCE TO PRIOR APPLICATIONS

This application is a continuation of and claims priority to U.S. application Ser. No. 11/072,938, filed Mar. 3, 2005 now U.S. Pat. No. 6,992,903, which is a continuation of and claims priority to U.S. application Ser. No. 10/850,889, filed May 20, 2004, now U.S. 6,894,909 B2, which is a continuation of and claims priority to U.S. application Ser. No. 10/392,998 filed Mar. 19, 2003, now U.S. Pat. No. 6,762,946 B2, which is a continuation of and claims priority to U.S. application Ser. No. 10/052,975, filed Jan. 17, 2002, now issued as U.S. Pat. No. 6,549,431 B2, which claims the benefit of and claims priority to U.S. provisional application Ser. No. 60/274,689, filed Mar. 8, 2001, entitled "Method and Apparatus for Substantially Reducing Electrical Earth Displacement Current Flow Generated by Wound Components," and also claims the benefit of and claims priority to U.S. provisional application Ser. No. 60/316,565, filed Aug. 31, 2001, entitled "Method and Apparatus for Substantially Reducing Electrical Earth Displacement Current Flow Generated by Wound Components."

BACKGROUND OF THE INVENTION

1. Field of the Invention

The present invention relates generally to energy transfer elements and, more specifically, the present invention relates to energy transfer elements having multiple windings.

2. Background Information

FIG. 1 shows an outline schematic diagram of a flyback power supply 101. The basic operation of the flyback converter 101 is well documented and known to one skilled in the art. The primary switch 103 is controlled through a feedback control signal 105, typically but not necessarily from the secondary of the power supply as shown. The energy transfer element or transformer 107 windings have a dot polarity that is used to indicate the phase relationship of the winding voltages. During voltage transitions across the windings, the dot end of the windings are in phase.

FIG. 2 is a schematic of a power supply 201, which expands on the outline schematic of FIG. 1 by representing the parasitic capacitances 209 that exist between the transformer core and electrical earth, the parasitic capacitances 211 that exist between the input and output windings and the transformer core and also the parasitic capacitances 213 that exist between the input and output windings of the transformer. Usually the transformer core is the ferrite core used in the transformer construction to provide a low reluctance path for the magnetic flux coupling input and output windings of the transformer 207. As noted in FIG. 2, the parasitic capacitance 215 between the output of the transformer and electrical earth in some cases maybe be short circuited depending on the application and or the way in which the electrical noise measurements are made.

During the normal operation of the power supply 201, the voltages across both input and output windings of the transformer 207 transition in accordance with the standard flyback power supply operation. These transitions generate displacement currents in the electrical earth through the various parasitic capacitances 209, 211, 213 and 215 shown. These displacement currents are detected as common mode noise (or emissions) and measured by a piece of test equipment called a Line Input Stabilization Network (LISN). The configuration and connection of this equipment is well documented and known to one skilled in the art.

FIG. 2 also highlights capacitor Cy 217 which is a Y-capacitor, that is commonly used in switching power supplies to reduce the common mode emissions. This component, capacitor Cy 217, provides a low impedance path for displacement currents flowing between input and output windings of the transformer 207, to return to their source without flowing through electrical earth. The currents in capacitor Cy 217 are not detected by the LISN and its use therefore acts to reduce common mode emissions.

SUMMARY OF THE INVENTION

An energy transfer element having an energy transfer element input winding and an energy transfer element output winding is disclosed. In one aspect, the energy transfer element input winding is capacitively coupled to the energy transfer element output winding. The energy transfer element is capacitively coupled to electrical earth. One or more additional windings are introduced as part of the energy transfer element. The one or more additional windings substantially reduce capacitive displacement current between the energy transfer element input winding and energy transfer element output winding by balancing the relative electrostatic fields generated between these windings and/or between the energy transfer element and electrical earth by canceling the electrostatic fields generated by all windings within the energy transfer element relative to electrical earth through the selection of the physical position and number of turns in the additional windings. Additional features and benefits of the present invention will become apparent from the detailed description and figures set forth below.

BRIEF DESCRIPTION OF THE DRAWINGS

The present invention detailed illustrated by way of example and not limitation in the accompanying figures.

DETAILED DESCRIPTION

Figure 1:
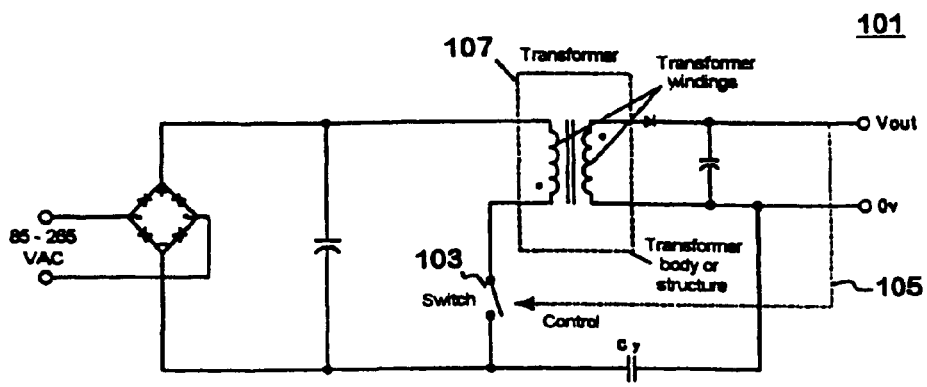
FIG. 1 is a schematic diagram of a flyback power supply.
Figure 2:
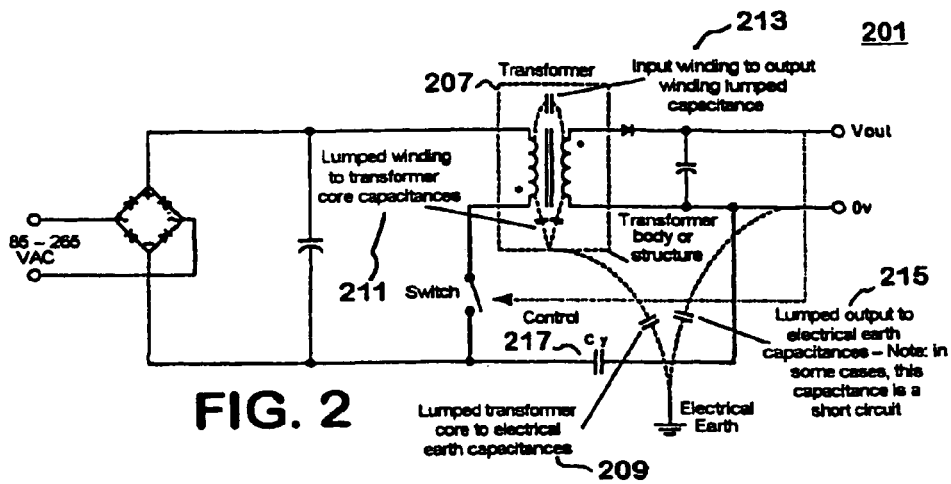
FIG. 2 is a schematic diagram of a flyback power supply showing parasitic capacitances.

Embodiments of methods and apparatuses for reducing electrical earth displacement current flow generated by wound components are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Causes of electrical noise generated by switching power supply circuits are well documented and known to those skilled in the art. This invention specifically deals with the reduction in common mode noise generated by the energy transfer element, commonly referred to as the power supply transformer, during the operation of a switching power supply.

Since these techniques can be applied to flyback and forward converters, it is more accurate to refer to the transformer as the energy transfer element. However in the specific embodiment discussed here, a flyback circuit example is discussed and the energy transfer element is referred to as a transformer.

Various embodiments of the present invention described in herein provide techniques that are used in the construction of a transformer to substantially reduce the electrical earth currents generated by the power supply allowing the system cost to be reduced either by eliminating the requirement to use a Y-capacitor or by reducing the value of Y capacitor necessary. Reducing the value of or eliminating the Y capacitor also reduces leakage currents between the safety isolated output and the AC input line. This is advantageous in applications where the output can come in contact with the user such as for example but not limited to cellular phone applications or the like.

In particular, various embodiments of the techniques described herein substantially reduce the capacitive displacement currents that normally flow in a switching power supply between the primary and secondary windings, and the core of the transformer and electrical earth. In one embodiment, the reduction is achieved with the addition of windings in the transformer. In one embodiment, the number of turns of these additional windings are specifically selected based on the main winding turns to cancel and balance differential electrostatic fields generated by the main windings. These displacement currents normally require that extra measures, such as for example in the form of external components, are taken in the design of the switching power supply to avoid these displacement currents interfering with other equipment. Various embodiments of the present invention therefore reduce system cost by eliminating certain power supply components that would otherwise be necessary to a designer not having the benefit of this disclosure.

As an overview, displacement currents generated by the operation of a switching power supply and flowing to electrical earth, are measured as electrical noise, also known as common mode emissions, that can cause electromagnetic interference (EMI) to other equipment. It is therefore necessary to maintain these currents below published limits set up by regulatory bodies globally. Transformers in switching power supplies generate displacement current flow to electrical earth in two ways.

One of the ways is the flow of displacement current between the core of the transformer and electrical earth This current is generated by voltage transitions on the transformer windings coupling capacitively to the core of transformer. This current then flows capacitively through free space between the core of the transformer and electrical earth.

The other way is the flow of displacement current between the primary and secondary windings of the transformer, which are set up by differential voltages between these windings. Differential voltages between these windings generate current flow in the inter-winding capacitance. This displacement current will return to its source through parallel paths one of which is electrical earth.

Various embodiments of the present invention describe the use of one or more additional windings within the transformer construction that employ the natural voltage fluctuations of the transformer windings to balance and cancel the relative electrostatic fields between the input and output windings that arise during the switching power supply operation. In one embodiment, the design of these additional windings is specific to a particular transformer both in terms of the number of turns used and their physical positioning. Through use of these techniques, the displacement current flow between the transformer windings and transformer physical structure to electrical earth is substantially reduced. This in turn eliminates or reduces the cost of external components such as Y capacitors that are used to reduce common mode emissions.

Figure 3A:
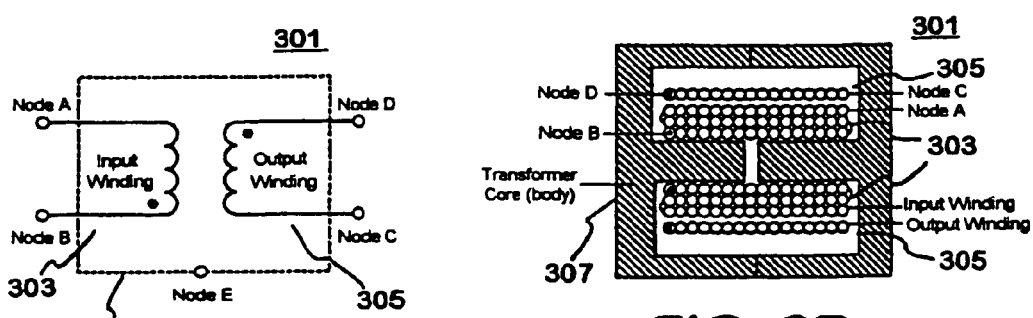
FIG. 3A is a schematic diagram of a transformer.

To illustrate, FIG. 3A shows a simple outline schematic of a transformer 301. The two ends of the input winding 303 are labeled nodes A and B. The two ends of the output winding 305 are labeled nodes C and D. For the purposes of this description, the physical core 307 of the transformer is labeled as a further node E. The dot polarity of the windings 303 and 305 is such that when there is a voltage transition on the input winding 303 such that node B is becoming more positive relative to node A, the voltage of node D will increase relative to node C.

As described above, these voltage transitions generate displacement currents in the parasitic capacitances resulting in current flowing to electrical earth. As will be discussed, additional windings are provided in one embodiment of the present invention to substantially reduce these electrical earth currents.

In particular, in one embodiment, a winding technique is used to reduce displacements currents between the transformer windings 303 and 305 and transformer core 307. In the construction of the transformer 301, one of the windings 303 or 305 is normally in closer proximity to the transformer core 307 than the other. Furthermore one of the windings 303 or 305 typically has higher voltage transitions across it.

Figure 3B:
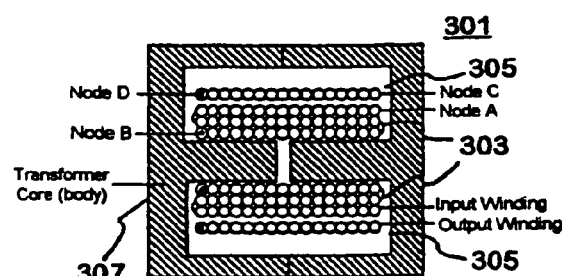
FIG. 3B is a cross section of a layer wound flyback transformer.

For instance, FIG. 3B shows the typical cross section of a layer wound flyback transformer 301 where node B of input winding 303 is wound closest to the transformer core 307. The output winding 305 is wound outside the input winding 303 and therefore has less influence on the generation of displacement currents between windings 303 and 305 and transformer core 307 since it is physically further from the transformer core 307.

Figure 4A:
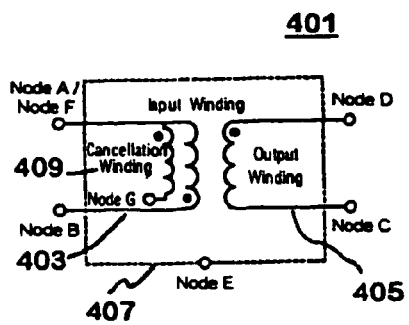
FIG. 4A is a schematic diagram of one embodiment of a transformer wound with a cancellation winding in accordance with the teachings of the present invention.

FIG. 4A shows the schematic of one embodiment of a transformer 401 wound with a cancellation winding 409 coupled to the primary input winding 403 since the placement of the primary input winding 403 in this case has most influence on the winding to transformer core 407 displacement current.

Figure 4B:
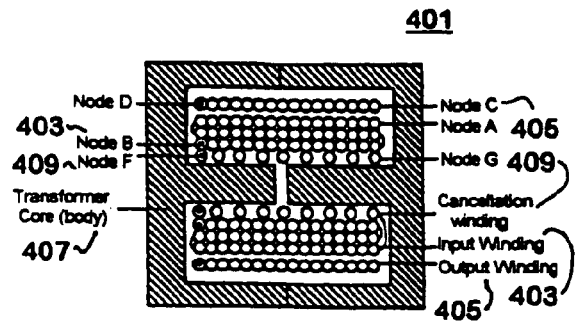
FIG. 4B is a cross section of one embodiment of a transformer with a cancellation winding in accordance with the teachings of the present invention.

FIG. 4B shows the cross section of one embodiment of the transformer 401 with cancellation winding 407 between Nodes F and G. As shown in the depicted embodiment, Node F is connected to node A and Node G is left uncoupled electrically. In one embodiment, the dot polarity of the cancellation winding 409 is such that its electrostatic field opposes that created by the input winding 403.

In one embodiment, the exact choice of the number of turns used in this cancellation winding 409 is determined based on empirical optimization techniques. In one embodiment, the variables considered include the percentage of the overall primary winding voltage seen by the first layer of the primary input winding 403, which is 33% in the embodiment illustrated in FIG. 4b since there are 3 layers. However since the first layer of the input winding 403 is now further from the transformer core 407 due to the presence of the cancellation winding 409, its electrostatic field is weaker at the transformer core 407. As such, the cancellation winding 407 typically requires fewer turns than the first layer of the input winding 403 to provide cancellation.

In one embodiment, the exact cancellation is more complex since there are lesser influences from all windings 403, 405 and 409, hence the reason that empirical techniques provide an effective optimization. In one embodiment, the net effect is that the influence of the electrostatic field produced by the other windings in the transformer construction relative to the transformer core 407 are cancelled by the electrostatic field created by the cancellation winding 409. Consequently the displacement current between transformer windings and transformer core is theoretically zero if the electrostatic fields perfectly cancel. In practice, the effect is to substantially reduce the net displacement current.

Figure 5A:
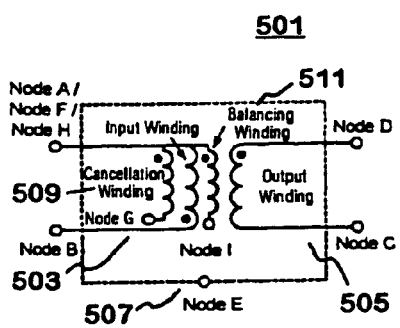
FIG. 5A is a schematic diagram of one embodiment of a transformer wound with a balancing winding in accordance with the teachings of the present invention.
Figure 5B:
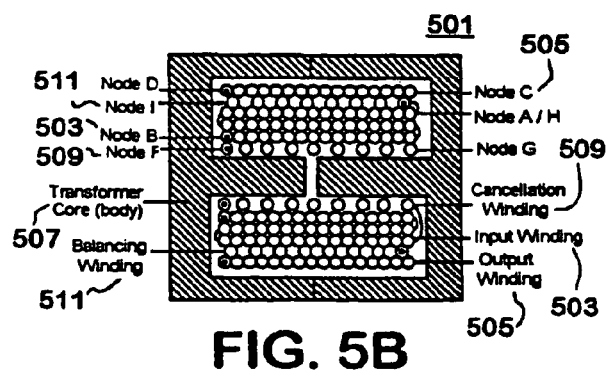
FIG. 5B is a cross section of one embodiment of a transformer with a balancing winding in accordance with the teachings of the present invention.

In another embodiment, a second winding technique is used to reduce the displacement current flowing between input winding and output winding. To illustrate, FIG. 5A shows the schematic of a transformer 501 having this additional winding which is referred to as a balancing winding 511 since its net effect is to balance the electrostatic fields generated between input and output windings 503 and 505 of the transformer 501. The transformer 501 of FIG. 5A and the cross section of transformer 501 illustrated in FIG. 5B show the balance winding 511 in conjunction with the cancellation winding 509 described above.

In the embodiment depicted in FIG. 5A, the balancing winding 511 between nodes H and I is shown coupled to the input winding 503 with the dot polarity such that the node H is connected to node A. In the embodiment depicted in FIG. 5B, a cross section of transformer 501 is shown with the inclusion of the balancing winding 511. In other embodiments balancing winding 511 is connected to the output winding 505, as is the case with an embodiment described below, depending on which of the windings is the prime generator of the displacement current. In a circuit where there are more output turns than input turns, the output winding 505 could be seen as the prime generator in which case, the optimum connection of the balancing winding 511 could be by coupling to the output winding 505.

In the embodiment depicted in FIG. 5A, the primary input winding 503 is assumed to be the prime generator and as such, the additional balance winding 511 is designed to oppose the electrostatic field generated by the input winding 503. In one embodiment, the number of turns are selected such that the net electrostatic field from the combination of the balancing and input windings 511 and 503, exactly matches that generated by the output winding 505. When this is achieved, the differential field between primary and secondary circuits is zero and the displacement current is also zero. In practice, the effect is to substantially reduce the net displacement current.

Figure 6A:
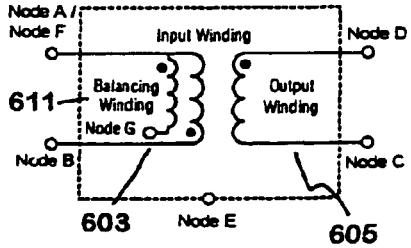
FIG. 6A is a schematic diagram of another embodiment of a transformer wound with a cancellation winding in accordance with the teachings of the present invention.
Figure 6B:
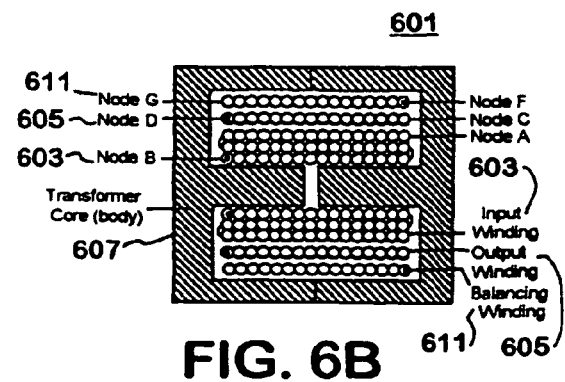
FIG. 6B is a cross section of another embodiment of a transformer with a balancing winding in accordance with the teachings of the present invention.

The embodiment illustrated in FIGS. 6A and 6B shows another technique to substantially reduce the net displacement current between the input and output windings 603 and 605 of the transformer 601 and displacement current that flows capacitively through free space between the core of the transformer and electrical earth. In particular, FIG. 6A is a schematic diagram of transformer 601 wound with a balancing winding 611 and FIG. 6B shows a cross section of transformer 601 with balancing winding 611 in accordance with the teachings of the present invention. With the technique as illustrated in FIGS. 6A and 6B, the balancing winding 611 is positioned outside the output winding 605 in the construction of the transformer 601. The dot polarity of balancing winding 611 is such that it opposes the electrostatic field generated by the input winding 603 relative to the output winding 605.

Referring to the node designation in FIGS. 6A and 6B, Node D of the output winding 605 is positioned to reduce the relative electrostatic field between the main input winding 603 and the output winding 605. However, in the embodiment shown, the input winding 603 has 3 layers and therefore 33% of the voltage across the primary input winding 603 is seen in the outer most layer next to the output winding 605. Since, in a typical design, the output winding 605 has fewer turns than the outer layer of the primary input winding 603, the input winding 603 is the primary generator of displacement current. By electrically coupling Nodes A and F, Node G opposes the electrostatic field generated by the input winding 603. The correct choice of number of turns therefore substantially reduces the net displacement current between input and output windings 603 and 605.

The position of the balancing winding 611 on the outside of the other windings in the transformer construction also means that its electrostatic field opposes that of the input winding 603 relative to the physical core 607 of the transformer 601. In this way the balancing winding 611 in this embodiment also provides a degree of cancellation of capacitively coupled displacement current through free space between the core of the transformer and electrical earth, previously provided by the separate cancellation winding 409 of FIG. 4.

This single winding technique also provides the advantage of reducing the leakage inductance between the input and output windings 603 and 605 since these two windings are physically closer in the transformer construction.

The overall effectiveness of this single winding technique to provide the cancellation functions described above is dependent on the physical nature of the particular transformer and the ability to position the winding optimally with respect to both the output winding 605 and the physical core 607 of the transformer 601. As such, the embodiment described below employs the two winding technique described earlier.

Figure 7A:
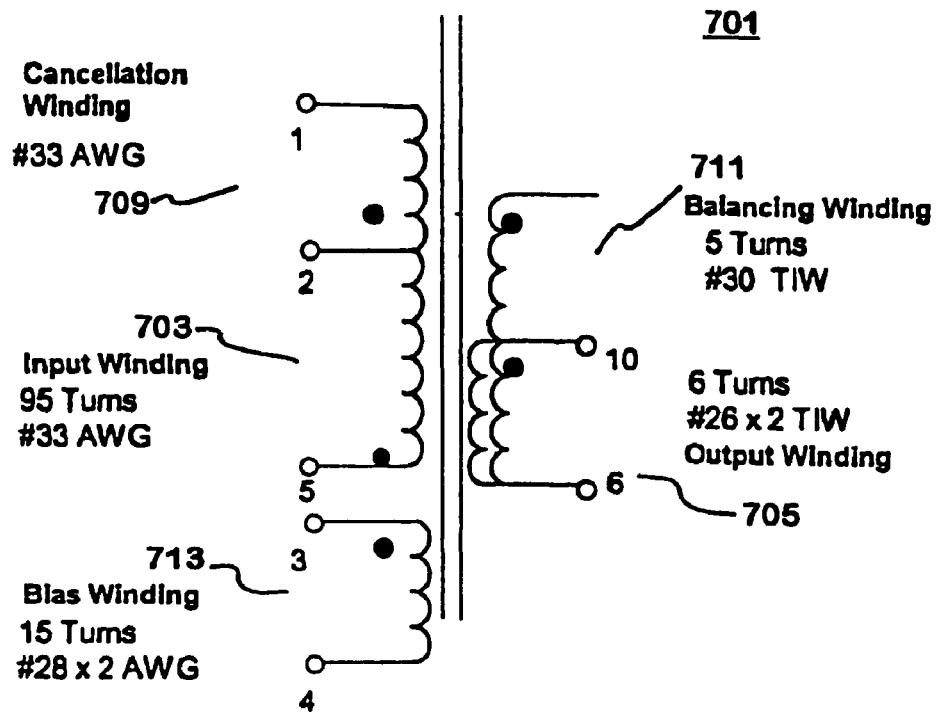
FIG. 7A is a schematic diagram of yet another embodiment of a transformer in accordance with the teachings of the present invention.
Figure 7B:
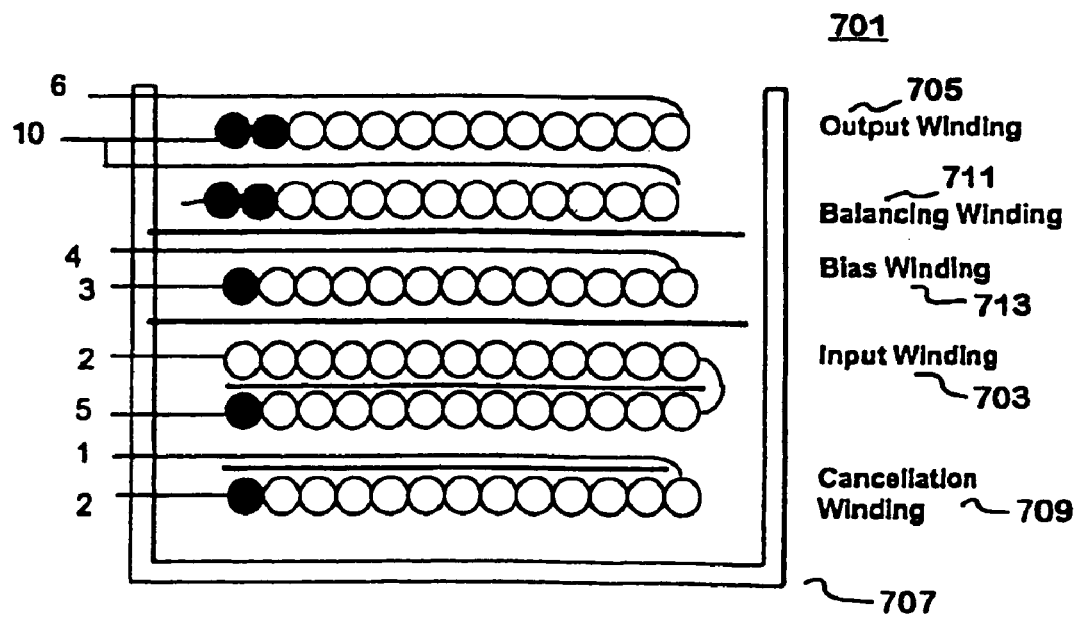
FIG. 7B is a cross section of yet another embodiment of a transformer in accordance with the teachings of the present invention.

FIG. 7A shows specific details of a schematic and cross section of one embodiment of a transformer 701 using the techniques described above in accordance with the teachings of the present invention. FIG. 7B shows a cross-section of one embodiment of transformer 701 in accordance with the teachings of the present invention. This design of transformer 701 has a cancellation winding 709 between the main input winding 703 (primary) and the transformer core 707. In addition, this design uses a bias winding 713 as the low voltage supply for the power supply switching regulator circuitry coupled to the input winding 703. The balancing winding 711 in this case is coupled to the output winding 705 since, in this particular design, the output winding 705 is the primary generator of common mode displacement currents flowing between the primary and secondary input and output windings 703 and 705. According to the description above therefore, this coupling of the balancing winding 711 provides the optimum performance.

Tables I, II, III, and IV below summarize the electrical specifications, materials, winding instructions and winding circuit connections associated with one embodiment of transformer 701 in accordance with the teachings of the present invention.

TABLE I

Electrical Specifications.

| Electrical Strength | 60 Hz 1 minute, from Pins 1–5 to Pins 6–10 | 3000 Vac |
|---|---|---|
| Creepage | Between Pins 1–5 and Pins 6–10 | 6.2 mm (Min.) |
| Primary Inductance | All windings open | 980 uH +/− 10% |
| Resonant Frequency | All windings open | 500 KHz (Min.) |
| Primary Leakage Inductance | Pins 6–10 shorted | 35 uH |

TABLE II

Materials.

| Item | Description |
|---|---|
| [1] | Core: EE19 Gapped for AL of 170 nH/T$^2$ |
| [2] | Bobbin: YC-190Z EE-19 |
| [3] | Magnet Wire: #33 AWG Heavy Nyleze |
| [4] | Triple insulated wire: #26 AWG Heavy Nyleze |
| [5] | Magnet Wire: #28 AWG Heavy Nyleze |
| [6] | Tape: 3M 1298 Polyester Film (white) 9.0 mm wide by 2.2 mils thick |
| [7] | Varnish |

TABLE III

Winding Instructions.

| | |
|---|---|
| Cancellation Winding | Start at Pin 2. Wind one layer from left to right. Cover with one layer of Mylar tape. Lay end of wire over tape and cover with another layer of tape. |
| Input Winding | Start at Pin 5. Wind 95 turns of item [3] from left to right. Wind in 3 layers. Apply 1 layer of tape, item [6], for basic insulation between each layer. Finish on Pin 2. |
| Basic Insulation | 1 layer of tape [6] for basic insulation. |
| Bias Winding | Start at Pin 3. Wind 15 bifilar turns item [5] from left to right. Wind uniformly, in a single layer, across entire width of bobbin. Finish on Pin 4. Cover winding with one layer of tape and layover end of wire. |
| Basic Insulation | 1 layer of tape [6] for basic insulation. |
| Balancing Winding | Start with item #4 taped and unterminated and wind five turns evenly left to right. Finish on pin 10. |

TABLE III-continued

Winding Instructions.

| | |
|---|---|
| Output Winding | Start at Pin 10. Wind 6 turns of item [4] bifilar from left to right. Wind uniformly, in a single layer, across entire width of bobbin. Finish on Pin 6. |
| Final Assembly | Assemble and secure core halves. Impregnate uniformly [7]. |

TABLE IV

Winding Circuit Connections.

| Pin 1 | No Connection |
|---|---|
| Pin 2 | Priniaiy DC Input |
| Pin 5 | Drain (or Switching Element) Connection |
| Pin 3 | Bias Output |
| Pin 4 | Bias Return |
| Pin 6 | Output Return |
| Pin 10 | Output |

Note that in one embodiment, the balancing winding dot phase is unterminated.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An article of manufacture, comprising:
   a first winding wound around a core, the first winding having a first end and a second end;
   a second winding wound around the core, the first winding having a first end and a second end, wherein when there is a voltage transition on the first winding such that a voltage on the second end of the first winding becomes more positive than a voltage on the first end of the first winding, a voltage on the second end of the second winding increases relative to the first end of the second winding; and
   a third winding coupled to the first winding and wound around the core, the third winding having a first end and a second end, wherein the first end of the third winding is electrically coupled to the first end of the second winding, wherein the second end of the third winding is uncoupled such that an influence of an electrostatic field to be produced by the first and second windings relative to the core are to be cancelled by an electrostatic field to be created by the third winding.

2. The article of manufacture of claim 1 wherein the first end of the third winding is electrically coupled to the first end of the first winding.

3. The article of manufacture of claim 1 further comprising a fourth winding wound around the core between the first and second windings, the fourth winding having a first end and a second end.

4. The article of manufacture of claim 3 wherein the first end of the fourth winding is electrically coupled to the first end of the first winding.

5. The article of manufacture of claim 3 wherein the first end of the fourth winding is electrically coupled to the first end of the second winding.

* * * * *